Figure 1:
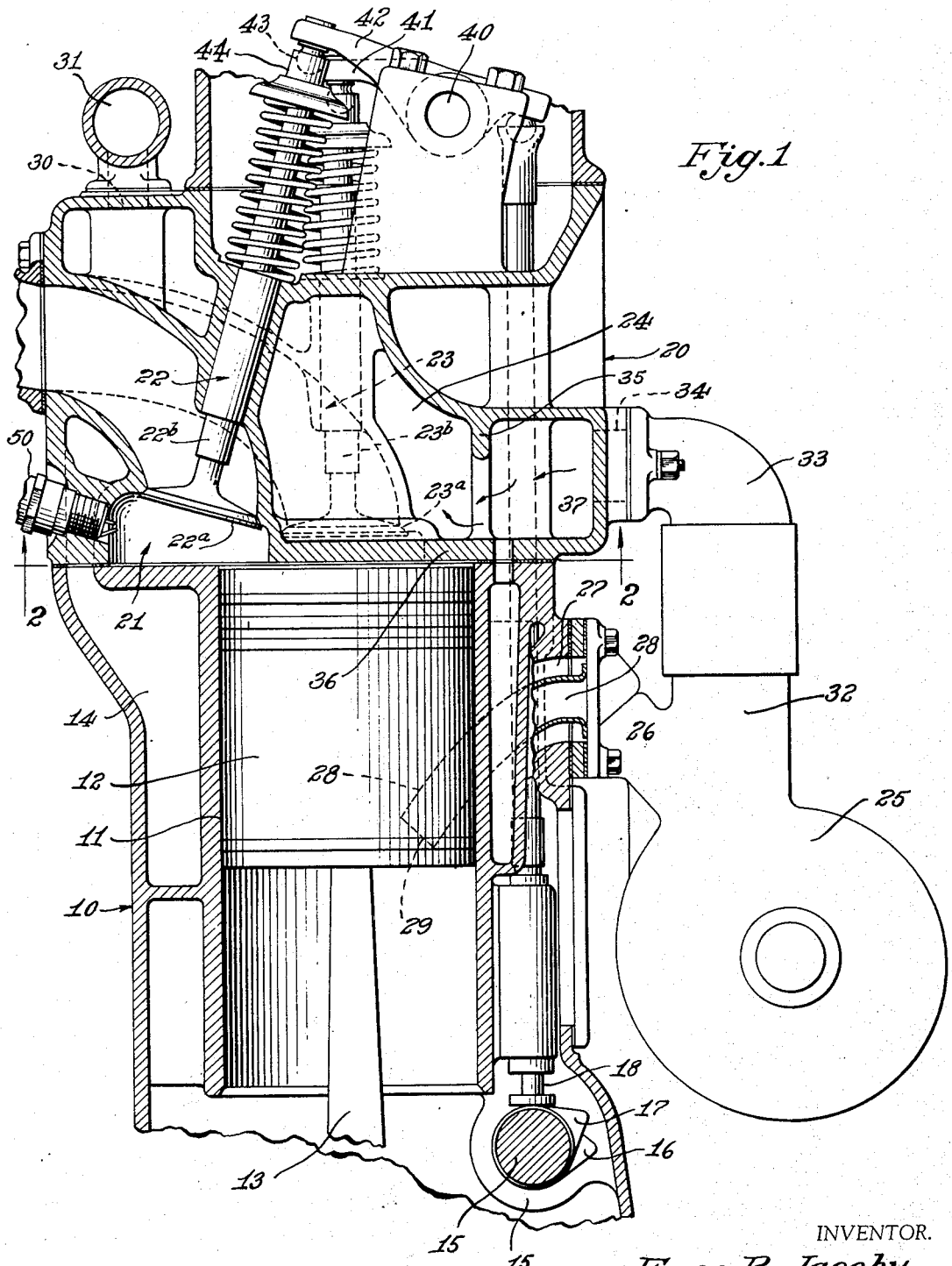

Oct. 5, 1937. E. R. JACOBY 2,094,893
ENGINE
Original Filed Sept. 2, 1933 3 Sheets-Sheet 1

INVENTOR.
Enos R. Jacoby
BY
ATTORNEY.

Oct. 5, 1937.  E. R. JACOBY  2,094,893
ENGINE
Original Filed Sept. 2, 1933   3 Sheets-Sheet 2
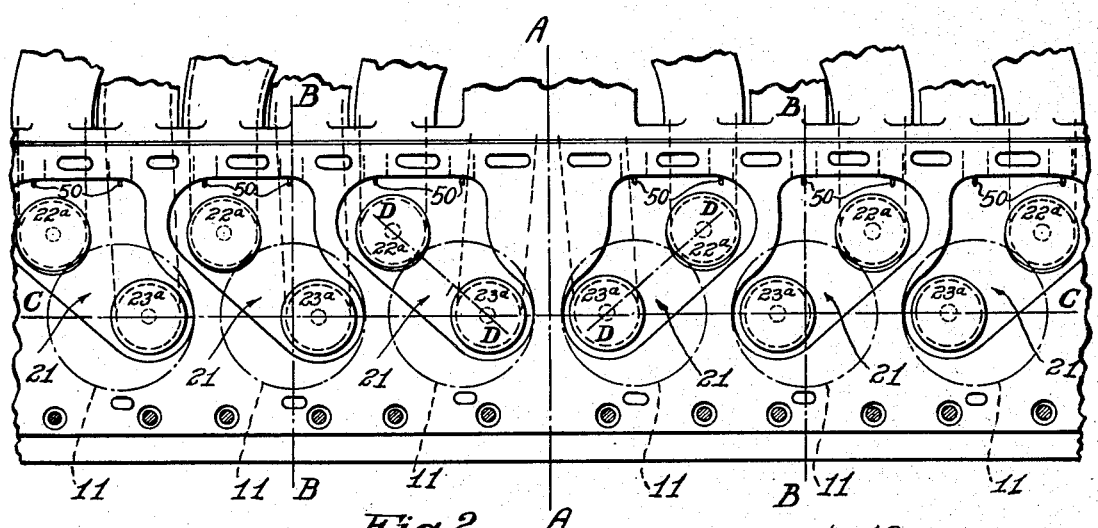
Fig. 2
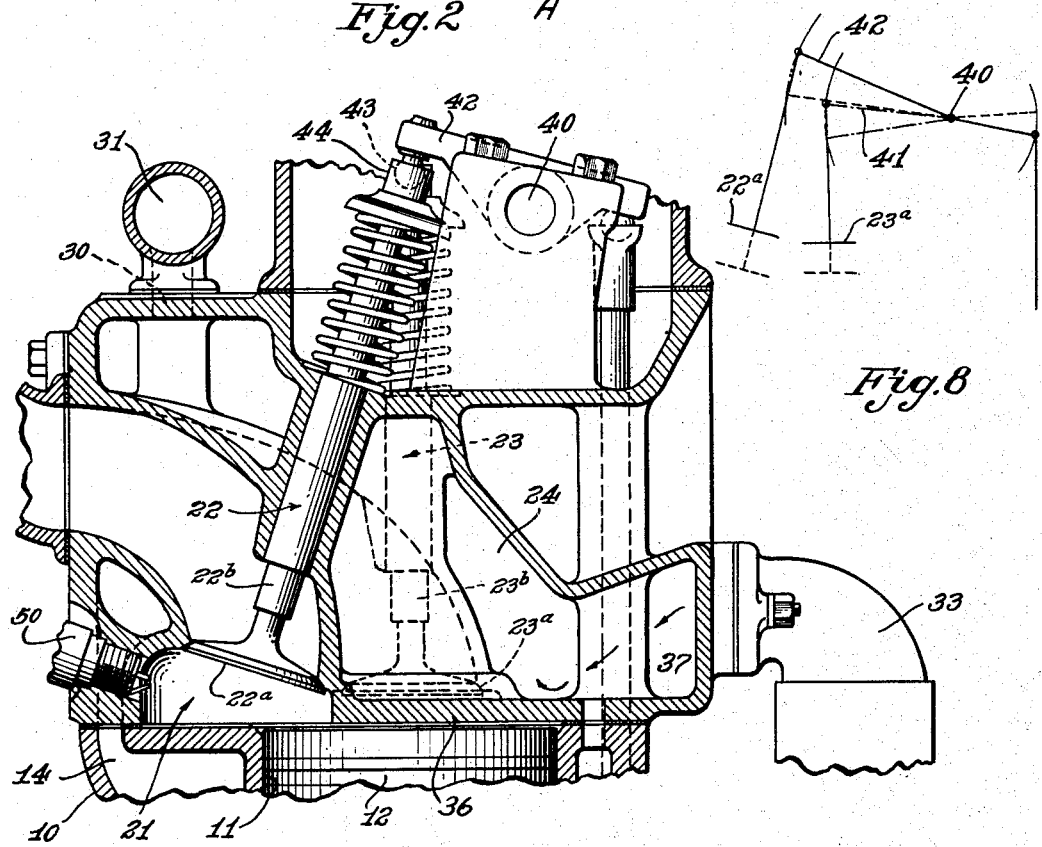
Fig. 3
Fig. 8
INVENTOR.
Enos R. Jacoby
BY
ATTORNEY.

Oct. 5, 1937.  E. R. JACOBY  2,094,893
ENGINE
Original Filed Sept. 2, 1933   3 Sheets-Sheet 3

INVENTOR.
Enos R. Jacoby
BY
ATTORNEY.

Patented Oct. 5, 1937

2,094,893

UNITED STATES PATENT OFFICE 2,094,893

ENGINE

Enos R. Jacoby, Detroit, Mich., assignor to Continental Motors Corporation, Detroit, Mich., a corporation of Virginia Original application September 2, 1933, Serial No. 687,931. Divided and this application May 23, 1934, Serial No. 727,030

6 Claims. (Cl. 123—59)

This invention relates to engines and more particularly to the cylinder head construction with particular reference to the arrangement and construction of the combustion chambers and the arrangement and construction of the valves and valve actuating mechanisms for controlling engine intake and exhaust.

In order to maintain a high standard of efficiency and to generally improve engine performance, it is found that this may be obtained by providing improved combustion and by relatively improving the volumetric efficiency of the engine without relatively increasing the length or overall size of the engine, and such improvements, arising from the continual efforts in constantly improving engine performance, have been one of the factors in maintaining the high quality standards demanded by the consumers and other users of engines employed for operating vehicles of all descriptions.

One of the objects of my present invention is to generally improve engine performance and to relatively increase the power output of an engine without adding to the total weight of the engine and without materially increasing the manufacturing costs, by providing improved combustion chamber construction.

Another object of my present invention is to relatively improve the volumetric efficiency of engines of the character described by providing a novel valve arrangement and construction whereby to permit the use of valves affording a greater intake opening and further providing a relatively greater exhaust opening by reason of the relatively increased diameter of the valves assembled with a structure of the character illustrated and described.

More particularly it is an object of my present invention to provide a valve arrangement for controlling engine intake and exhaust in which the valve stems of the intake valve structure are relatively inclined with respect to the valve stems of the exhaust valve structure whereby to permit an angular arrangement of the valves providing a large number of combinations of rocker arm ratios, valve lifts, and various valve positions for any given cam lift.

More particularly, it is a further object of my present invention in connection with the construction and arrangement of the combustion chambers to provide a construction especially suitable for use in a multiple cylinder of the cylinders-in-line type engine by providing combustion chambers which may overlap longitudinally of the engine and because of their shape, said combustion chambers can be "nested" for conservation of longitudinal length of the engine, said combustion chamber construction further cooperating with the valve arrangement and constructed for providing generally improved engine construction.

This application is a division of my co-pending application, Ser. No. 687,931, filed September 2, 1933.

Figure 4:
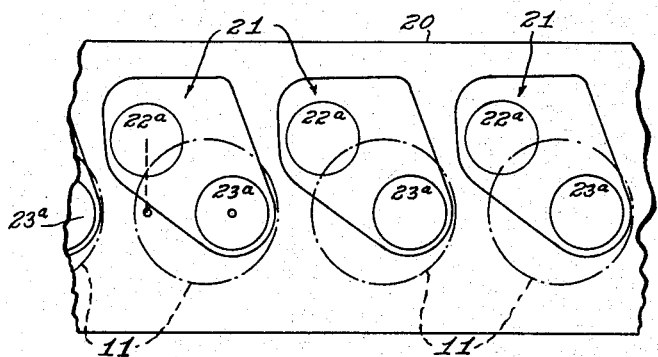
Figure 5:
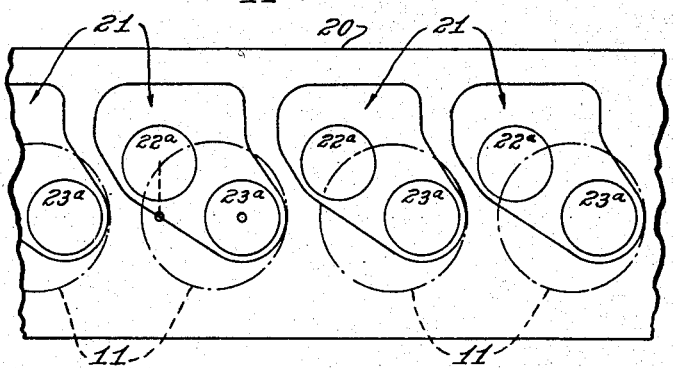
Figure 6:
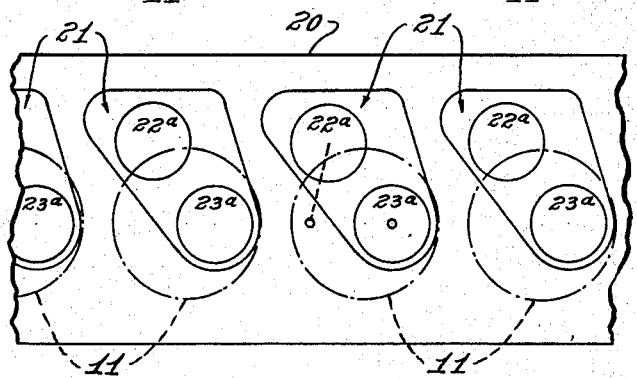
Figure 7:
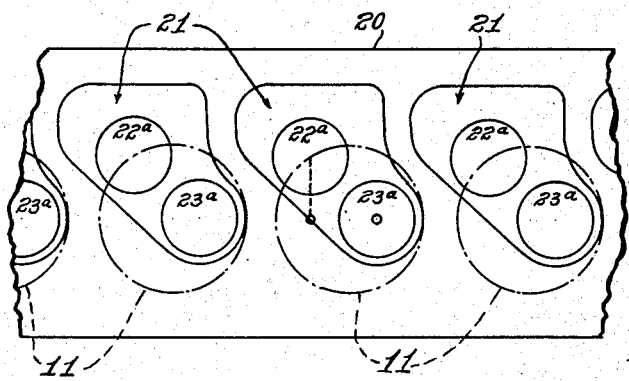

For a more detailed understanding of my invention, reference may be had to the accompanying drawings which illustrate preferred embodiments of my invention, and in which:

Fig. 1 is a transverse vertical sectional view through an engine illustrating a typical cylinder, and cylinder head construction embodying a combustion chamber and valve arrangement construction in accordance with the principles of my invention, Fig. 2 is a bottom plan view of the cylinder head structure for a multiple cylinder of the cylinders-in-line type engine, this view illustrating the arrangement and construction of the preferred combustion chamber construction, Fig. 3 is a fragmentary vertical transverse sectional view of an engine showing a cylinder head structure embodying a modified form of valve arrangement and construction, Fig. 4 is a fragmentary bottom plan view of the cylinder head structure showing a modified form of combustion chamber, Fig. 5 is another bottom plan view of the cylinder head structure embodying a further modified combustion chamber arrangement construction, and further showing a modified valve arrangement, Fig. 6 is a bottom plan view of a cylinder head construction embodying a further modified combustion chamber construction and showing a still further modified valve arrangement, Fig. 7 is a bottom plan view of a cylinder head construction embodying still further modifications of the combustion chamber and valve arrangement, and, Fig. 8 is a diagrammatic view illustrating a modified form of rocker arm construction especially suitable for use with a valve arrangement of the character illustrated in the preceding figures in which the valve stem of one valve structure is inclined with respect to the valve stem of the other valve structure.

The figures in the accompanying drawings are broadly illustrative of a standard engine structure including a cylinder block 10 having a plurality of aligned cylinders 11 in which pistons 12 are operable, said pistons being adapted for connection with an engine crankshaft (not shown) in the usual manner by means of the usual connecting rod 13. The cylinder is preferably jacketed as at 14 for the purpose of circulating a cooling medium in conjunction with the cylinder. A camshaft 15 is provided, this camshaft being supported in suitable bearings 15' carried by the cylinder block and including intake and exhaust cams 16 and 17, respectively, which cams are adapted to actuate the push rods 18 of the valve actuating mechanisms in the usual manner.

A cylinder head structure 20 is secured to the engine block in the usual manner and closes the outer open ends of the engine cylinders, this cylinder head structure being provided with a plurality of combustion chambers 21 each cooperating with an engine cylinder in the customary manner. Suitable overhead valve structures are carried by the cylinder head for controlling the engine intake and exhaust, said valve structures being respectively indicated as a whole by the reference characters 22 and 23 and including valves and valve stems respectively designated 22a, 22b and 23a and 23b. The cylinder head is jacketed as at 24 through which a cooling medium may be circulated for cooling the cylinder head structure, the cylinder head jacket 24 preferably being placed in communication with the cylinder jacket 14 in the usual manner.

The cooling medium is preferably circulated under pressure through the cylinder jacket 14 and the cylinder head jacket 24, said cooling medium being preferably introduced into the cylinder head jacket as well as into the cylinder jacket from a source of supply externally of the engine. In the present embodiment of my invention I have provided a pump structure 25 of any suitable construction and which is provided with an outlet 26 adapted to communicate with an inlet 27 of the cylinder jacket 14, the pump outlet 26 preferably communicating with a pipe or other suitable conduit 28 which projects within the cylinder jacket and terminates adjacent the bottom of said jacket, as at 29, the cooling water or other medium being introduced adjacent the bottom of the cylinder jacket and circulating upwardly or outwardly of the cylinder and thence into the cylinder head jacket 24 from which it is circulated through the cylinder head outlet 30 into the outlet pipe 31. The pump 25 is also provided with an outlet 32 communicating with a fixture 33 adapted for connecting the outlet 32 with the cylinder head, the cooling medium being thereby introduced directly into the cylinder head jacket through the inlet opening 34, said cooling medium being preferably directed as indicated by the arrows 37 by suitable deflecting means such as a baffle 35 into initial contact with the low ceiling portion 36 of the cylinder head structure, which overlies the cylinder and has a minimum clearance with respect to the piston when the piston reaches its outermost position of travel.

The particular features of this cooling arrangement whereby the cooling medium is introduced directly into the cylinder head and deflected towards the low ceiling portion of the cylinder head structure forms no part of the present invention as the same is described and claimed in applicant's co-pending application Serial No. 686,349, filed August 23, 1933, but it is evident that the cylinder head construction as embodied in the present invention is suitably adapted for cooperating assembly with a cooling system of this character.

In Fig. 2 of the drawings I have illustrated an arrangement and construction of combustion chambers which produce satisfactory results and which embody the principles of the invention as described and claimed. Although I have shown other modified forms of construction, illustrated generally in Figs. 4 to 7 inclusive, I wish it understood that the embodiment of my invention as illustrated in Fig. 2 is preferred, the other modifications being illustrative of the fact that the particular shape and construction of the combustion chambers may be varied within certain limits while still embodying the broad principles of my invention and without departing from the scope of the claims.

The combustion chamber construction is of a special utility in connection with an engine having aligned cylinders and may be incorporated with a multi-cylinder engine of 4, 6, 8 or more cylinders, Fig. 2 illustrating the invention in connection with a 6 cylinder engine. It will be noted that the combustion chambers 21 are arranged symmetrically with respect to the central transverse engine plane A—A and that the said combustion chambers are each so arranged as to preferably overlap the next adjacent combustion chamber longitudinally of the engine. These combustion chambers extend generally diagonally with respect to the longitudinal and transverse engine planes containing the cylinder axes, these latter planes of the engine being respectively indicated by the dot and dash lines C—C and B—B. By diagonally extending combustion chambers, I mean that the body of the combustion chamber extends in a direction generally diagonally with respect to these longitudinal and transverse engine planes. It will be noted that the combustion chambers are each extended substantially diagonally over the engine block to one side of the central longitudinal engine plane C—C and are also extended longitudinally of the engine for the most part to one side of the transverse engine plane B—B. It will be further noted that the combustion chamber is of such a shape as to provide a low ceiling cylinder head portion 36 which lies to one side of the longitudinal engine plane C—C and to the opposite side of said plane from the cylinder block overlying portion. It will be noted that the longitudinally extended portion of these combustion chambers which overlie the engine block are each arranged to overlap the adjacent combustion chamber portion which overlies the cylinder, this overlapping relationship being considered as overlapping longitudinally of the engine.

It will be obvious that the degree of overlapping of these combustion chambers longitudinally of the engine may be varied and that in some instances there may be no actual overlap longitudinally of the engine such as are illustrated in Figs. 4 and 6. However, in engine construction it is necessary that a definite minimum space be maintained between adjacent combustion chambers for the purpose of sealing against the escape of gases from one combustion chamber to the other, and in all instances it will be noted that this minimum spacing of the combustion chambers is maintained, while in all instances each of the combustion chambers is provided with a portion extending longitudinally of the engine toward the next adjacent combustion chamber. This construction of the combustion chambers provides for a relative "nesting" of said chambers for conserving of the longitudinal length of the engine. The combustion chambers as herein illustrated are also adapted for cooperative action with the valve arrangement and construction as hereinafter described in more detail. The symmetrical arrangement of these combustion chambers is clearly illustrated in Fig. 2, it being noted that that portion of each combustion chamber which overlies the cylinder block is extended longitudinally of the engine away from the central transverse engine plane A—A, said combustion chambers and engine cylinders being preferably grouped together to form a pair of groups divided by the central transverse engine plane A—A, each group having an equal number of cylinders and an equal number of combustion chambers, the combustion chambers of one group being extended in one direction longitudinally of the engine while the combustion chambers of the other group have extended portions extending in the opposite direction longitudinally of the engine.

As stated above, the valve structures each comprise a valve and a valve stem. One of the valve structures includes a valve located substantially over the engine cylinder and substantially contained or located in the longitudinal plane C—C of the engine containing the cylinder axes, the valve stem of this valve structure preferably extending substantially parallel with respect to this engine plane containing the cylinder axes, while the other valve structure is inclined with respect to the aforesaid first mentioned valve structure in such a way as to incline the valve stem with respect to the valve stem of said first mentioned valve structure. The valve of the inclined valve structure is preferably located for the most part in that portion of the combustion chamber overlying the cylinder block. In Fig. 2 the valve 22a is positioned to overlie the cylinder block for the major part of its area, while in the modifications shown in Figs. 4 to 7 inclusive, the valve 22a does not overlie the cylinder block to such a great extent although it does have a much greater portion overlying the cylinder block than the portion that overlies the cylinder. I prefer to employ the valve structure having a valve overlying the cylinder block as the intake valve of the engine while the other valve structure, located substantially in the longitudinal plane C—C of the engine, is preferably employed to control the engine exhaust. It will be noted that the intake valve structures 22 of all cylinders are substantially aligned and the exhaust valves 23 are also substantially aligned longitudinally of the engine, it being noted that the common plane containing the valve stems 22b is inclined with respect to the common plane containing the valve stems 23b. Obviously, the inclination or angular relationship between the valve stems may be varied within definite limits depending upon the desired location of the valves with respect to the combustion chamber. It will be noted that a line connecting the valve centers will extend substantially diagonally with respect to the longitudinal and transverse engine planes containing the cylinder axes, this line being shown in Fig. 2 and designated by the characters D—D, this diagonal line connecting the valve centers extending in a direction substantially parallel to the diagonal direction in which the combustion chambers are extended.

In Figs. 2 and 4 the valve centers are so located and the diameter of said valves is such as to provide no overlap of the valves longitudinally or transversely of the engine. In Fig. 5 the valves 22a and 23a are arranged to overlap transversely of the engine, in Fig. 6 said valves are arranged to overlap longitudinally of the engine, while in Fig. 7 these valves are arranged to overlap both longitudinally and transversely of the engine. Various combustion chamber constructions may be used or employed with the valve arrangements as illustrated in Figs. 2 and 4 to 7 inclusive, but in general, it will be noted that these combustion chambers all extend diagonally of the engine, they all have combustion chamber portions overlying the cylinder blocks which are extended longitudinally of the engine to one side of the engine transverse plane containing the cylinder axis and in a direction away from the central transverse plane A—A of the engine, a portion of the combustion chamber overlies the cylinders, and the head in each instance is provided with a low ceiling portion 36.

In Figs. 4, 5 and 7 it will be noted that the valve stem 22b lies in a transverse engine plane extending substantially perpendicularly to the longitudinal engine plane containing the cylinder axes, while in Fig. 6 it will be noted that the valve stem 22b may extend in a direction which is inclined to the said transverse engine plane that is perpendicular to said longitudinal engine plane whereby to provide a spacing longitudinally of the engine between the upper ends of the valve stems which is substantially equal to the spacing of the valve stems as shown in the other figures. Such a construction and arrangement of the valve stems as shown in Fig. 6 need only be employed when the valves are overlapped longitudinally of the engine, but even in this case it is not necessary in all instances that the valve stem be inclined as in Fig. 6 since it is possible in some instances to extend the valve stem as shown in Fig. 7 even when the said valves overlap longitudinally of the engine.

It will be noted that in Fig. 1 the angular relation between the valve structure, as shown by a transverse sectional view, is such as to provide a lateral spacing between the upper ends of the valve stems and obviously, this lateral spacing may be varied by varying the angle between the valve structures. If desired, the angle between the valve structures may be such as to provide no spacing between the upper end of the valve stems laterally or transversely of the engine as shown in Fig. 3.

Referring to the construction shown in Fig. 1 it will be noted that the rocker arms engaging these valve stems are supported on a common rocker shaft 40. The valve stem 23b is engaged by the rocker arm 41 while the valve stem 22b is engaged by a rocker arm 42, and it will be noted that, because of the lateral spacing of the ends of the valve stems, the rocker arm 42 is of greater length than the rocker arm 41, these rocker arms each carrying a ball 43 adapted for swivel engagement with the block 44 which directly engages the ends of the valve stems. It will be noted that the angular movement of the rocker arms 41 and 42 is equal for an equal cam lift, but due to the fact that the rocker arm 42 is longer and the ball carried thereby for engagement with the valve stem 22b is moved on an arc having a greater radius than the ball carried by arm 41, that a greater valve lift is imparted to the valve structure 22 than to the valve structure 23, this being desirable in some instances where a greater valve lift to the intake is desired. Obviously, it will be apparent that the valve lift of the valve structures 22 and 23 may be varied as desired by varying the angular relationship between the valve structures. In the construction illustrated in Fig. 3 the valve lift to the valve structure 22 is substantially equal to the valve lift of the valve structure 23.

Due to the angular relationship between said valve structures, it may be desirable in some instances to arrange the rocker arms 41 and 42 as shown in Fig. 1, and as diagrammatically illustrated in Fig. 8, so that the movement of the rocker arm transversely of the valve stem axis is a minimum due to the arcuate movement of the ball carried by the rocker arms which engages the valve stem, as this arrangement follows substantially along the customary lines it will be readily understood that the customary practice in engine design may be incorporated with the construction shown by applicant in which the valve structures are angularly inclined with each other.

It will be noted that the roof of the combustion chamber 21 in the vicinity of the valve 23a is substantially flush with the surface of the valve and in this instance the roof of the combustion chamber over the cylinder extends substantially in a plane at right angles to the cylinder axis, whereas the roof of the combustion chamber which overlies the cylinder block is sloped upwardly and outwardly and lies in a plane substantially flush with the surface of the valve 22a.

The spark plugs 50 are preferably located in that portion of the combustion chamber overlying the cylinder block and adjacent to the intake valves 22a. My combustion chamber construction readily provides a convenient place in which a pair of spark plugs or other igniting devices may be assembled for each combustion chamber (see Fig. 2). The intake gases on being introduced into the engine cylinder tend by reason of the arrangement shown in the accompanying drawings to sweep the exhaust valves in a manner as found desirable in engine construction. The arrangement of the intake and exhaust valves as here shown has been found to be highly preferable, and in fact, the location of the component parts of the engine structure which have to do with the efficient production of power to wit, the valve location, size, the spark plug location, and general shape of the combustion chamber which tends to direct the incoming fuel mixture in such a way as to promote turbulence, cooperate together in my invention for the promotion of generally improved engine performance. My arrangement provides for valves of larger diameter than is customary.

In the construction shown in the illustrated embodiment of my invention, it will be noted that I have provided a simple arrangement of combustion chamber construction, of valve arrangement and construction, whereby such generally improved engine performance is readily had without an increase in manufacturing costs and in which the labor for assembly of the engine is not increased to any extent. The construction herein shown is such as to permit a wide range of combination for providing engines for different purposes, but yet the principles of the invention are relatively simple even though they will effect a generally improved engine performance, greater power output, and greater volumetric efficiency.

It will be apparent to those skilled in the art to which my invention pertains that various modifications and changes may be made therein without departing from the spirit of my invention or from the scope of the appended claims.

What I claim as my invention is:

1. In an internal combustion engine having a plurality of aligned cylinders, a cylinder head structure closing the outer open ends of the cylinders and provided with a plurality of combustion chambers respectively cooperating with the engine cylinders, said combustion chambers each extending generally transversely of the engine and being arranged in two equal groups, one to either side of the medial transverse engine plane, the combustion chambers of one group having portions overlying the cylinder block extended generally longitudinally of the engine in the same direction to one side of the transverse engine planes containing the cylinder axes, the combustion chambers of the other group having portions overlying the cylinder block and extended generally longitudinally of the engine to one side of the transverse engine plane containing the cylinder axes in a direction opposite to that of said first group of chambers, said combustion chambers each having a portion overlapping a portion of the next adjacent combustion chamber longitudinally of the engine.

2. In an internal combustion engine having a plurality of aligned cylinders, a cylinder head structure closing the outer open ends of the cylinders, recessed on its under face to provide a plurality of combustion chambers each co-operating with an engine cylinder, said chambers being spaced longitudinally of the engine, and each having a portion overlying the axial part of its cylinder, and another portion offset laterally from the longitudinal cylinder axis plane, all of said offsets being to the same side of said plane, and said offset portions overlapping in one longitudinal direction the axial portion of one adjacent chamber.

3. In an internal combustion engine having a plurality of aligned cylinders, a cylinder head structure closing the outer open ends of said cylinders, said structure being provided in the face complemental to said open cylinder ends with a plurality of combustion chambers, each extending from the axis of a cylinder in a diagonal direction with respect to the common cylinder axis plane, and all to the same side of said plane, to partially overlie the engine block, the portion of a chamber overlying a cylinder being of less area than the latter, and the portion overlying the block being wider than the portion overlying the cylinder.

4. In an internal combustion engine having a plurality of aligned cylinders, a cylinder head structure closing the outer open ends of said cylinders, said structure being provided in the face complemental to said open cylinder ends with a plurality of combustion chambers, each extending from the axis of a cylinder in a diagonal direction with respect to the common cylinder axis plane, and all to the same side of said plane, to partially overlie the engine block, the portion of a chamber overlying a cylinder being of less area than the latter, and the portion overlying the block being wider than the portion overlying the cylinder and longitudinally overlapping the cylinder-overlying portion of one adjacent chamber.

5. In an internal combustion engine having a plurality of aligned cylinders, a cylinder head structure closing the outer open ends of said cylinders, said structure being provided in the face complemental to said open cylinder ends with a plurality of recesses of generally scalene-triangular shape constituting combustion chambers, one side of each combustion chamber lying substantially parallel to and laterally offset to the same side of the longitudinal cylinder-axis plane, and another side extending diagonally to said plane, whereby a portion of one chamber overlying the cylinder block longitudinally overlaps a portion of an adjacent chamber overlying its cylinder.

6. In an internal combustion engine having a plurality of aligned cylinders, a cylinder head structure closing the outer open ends of said cylinders, said structure being provided in the face complemental to said open cylinder ends with a plurality of recesses of generally scalene-triangular shape constituting combustion chambers, one side of each combustion chamber lying substantially parallel to and to the same side of the longitudinal cylinder-axis plane, and another side extending diagonally to said plane, whereby a portion of one chamber overlying the cylinder block longitudinally overlaps a portion of an adjacent chamber overlying its cylinder; and inlet and exhaust valves in each chamber being located substantially at the apices of the overlapping portions.

ENOS R. JACOBY.